(12) United States Patent
Jeon et al.

(10) Patent No.: US 8,778,566 B2
(45) Date of Patent: Jul. 15, 2014

(54) METAL SEPARATOR PLATE FOR FUEL CELL HAVING COATING FILM FORMED ON SURFACE AND METHOD FOR PRODUCING SAME

(75) Inventors: Yoo-Taek Jeon, Yongin-si (KR); Ki-Jung Kim, Yongin-si (KR)

(73) Assignee: Hyundai Hysco, Ulsan (KR)

( * ) Notice: Subject to any disclaimer, the term of this patent is extended or adjusted under 35 U.S.C. 154(b) by 89 days.

(21) Appl. No.: 13/391,013

(22) PCT Filed: Aug. 20, 2010

(86) PCT No.: PCT/KR2010/005525
§ 371 (c)(1),
(2), (4) Date: Feb. 17, 2012

(87) PCT Pub. No.: WO2011/021881
PCT Pub. Date: Feb. 24, 2011

(65) Prior Publication Data
US 2012/0148941 A1    Jun. 14, 2012

(30) Foreign Application Priority Data
Aug. 21, 2009    (KR) .................. 10-2009-0077832

(51) Int. Cl.
*H01M 8/04*    (2006.01)
*H01M 8/02*    (2006.01)
*H01M 8/10*    (2006.01)

(52) U.S. Cl.
USPC ........... 429/535; 429/509; 429/514; 429/518; 427/115

(58) Field of Classification Search
USPC ............... 429/509, 514, 518, 535; 427/115
See application file for complete search history.

(56) References Cited

U.S. PATENT DOCUMENTS

| | | | |
|---|---|---|---|
| 6,893,765 B1 * | 5/2005 | Nishida et al. | ................ 429/481 |
| 2002/0187379 A1 | 12/2002 | Yasuo et al. | |

(Continued)

FOREIGN PATENT DOCUMENTS

| | | |
|---|---|---|
| CA | 2704776 A1 | 5/2009 |
| CN | 1373912 A | 10/2002 |

(Continued)

OTHER PUBLICATIONS

The International Search Report issued for corresponding International PCT Application No. PCT/KR2010/005525, mailed Apr. 27, 2011, two pages.

(Continued)

*Primary Examiner* — Gregg Cantelmo
(74) *Attorney, Agent, or Firm* — Lowe Hauptman & Ham, LLP (57) ABSTRACT

Disclosed herein is a method for manufacturing a metal steel separator for fuel cells that has corrosion resistance and contact resistance not only at an initial stage but also after being exposed to high temperature/high humidity conditions in the fuel cell for a long period of time. The method includes preparing a stainless steel sheet as a matrix of the metal separator, forming a discontinuous coating film on the surface of the stainless steel sheet, the coating film being composed of at least one selected from gold (Au), platinum (Pt), ruthenium (Ru), iridium (Ir), ruthenium oxide ($RuO_2$), and iridium oxide ($IrO_2$), and heat treating the stainless steel sheet having the discontinuous coating film to form an oxide film on a portion of the stainless steel sheet on which the coating film is not formed. A metal separator for fuel cells manufactured by the method is also disclosed.

7 Claims, 6 Drawing Sheets

(56) References Cited

U.S. PATENT DOCUMENTS

| | | |
|---|---|---|
| 2005/0089742 A1* | 4/2005 | Ishigami et al. .......... 429/34 |
| 2007/0243452 A1 | 10/2007 | Weidman et al. |
| 2009/0042084 A1 | 2/2009 | Kobayashi et al. |
| 2010/0035118 A1 | 2/2010 | Sato et al. |

FOREIGN PATENT DOCUMENTS

| | | |
|---|---|---|
| EP | 2068389 A1 | 6/2009 |
| JP | 2001297777 A | 4/2000 |
| JP | 2006097088 A * | 4/2006 |
| JP | 2008-004498 | 1/2008 |
| KR | 10-0844023 | 7/2008 |
| RU | 2100877 C1 | 12/1997 |
| RU | 2180977 C2 | 3/2002 |
| WO | 0122513 A1 | 3/2001 |
| WO | 2006129806 A1 | 12/2006 |

OTHER PUBLICATIONS

Chinese Office Action dated Nov. 14, 2013.
Russian Notice of Allowance dated Dec. 20, 2013.

* cited by examiner

METAL SEPARATOR PLATE FOR FUEL CELL HAVING COATING FILM FORMED ON SURFACE AND METHOD FOR PRODUCING SAME

This is a National Phase Application filed under 35 U.S.C. §371 as a national stage of PCT/KR2010/005525, filed on Aug. 20, 2010, an application claiming the benefit under 35 U.S.C. §119 of Korean Application No. 10-2009-0077832, filed on Aug. 21, 2009, the content of each of which is hereby incorporated by reference in their entirety.

TECHNICAL FIELD

The present invention relates to a metal separator for a fuel cell and a method for manufacturing the same, and more particularly to a metal separator for a polymer electrolyte membrane fuel cell (PEMFC) that has a coating film formed on the surface of the separator to provide excellent corrosion resistance, electrical conductivity and durability, and a method for manufacturing the same.

BACKGROUND ART

In general, since a unit cell of a fuel cell generates too low a voltage to be used alone in practice, the fuel cell has several to several hundred unit cells stacked therein. When stacking the unit cells, a separator or bipolar plate is used to facilitate electrical connection between the unit cells and to separate reaction gases.

The bipolar plate is an essential component of a fuel cell along with a membrane electrode assembly (MEA) and performs a variety of functions such as structural support for the MEA and gas diffusion layer (GDLs), collection and transmission of electric current, transmission and removal of reaction gas, transmission of cooling water used for removal of heat, and the like.

Hence, it is necessary for materials of the separator to have excellent electrical and thermal conductivity, air-tightness, chemical stability, and the like.

Generally, graphite materials and composite graphite materials consisting of a resin and graphite mixture are used to form the separator.

However, graphite materials exhibit lower strength and air-tightness than metallic materials, and suffer from higher manufacturing costs and lower productivity when applied to manufacture of separators. Recently, metallic separators have been actively investigated to overcome such problems of graphite separators.

When a separator is made of a metallic material, there are many advantages in that volume and weight reduction of a fuel cell stack can be accomplished via thickness reduction of the separator, and in that the separator can be fabricated by stamping, which facilitates mass production of the separators.

In this case, however, the metallic material inevitably undergoes corrosion during use of the fuel cell, causing contamination of the MEA and performance deterioration of the fuel cell stack. Further, a thick oxide film can form on the surface of the metallic material after extended use of the fuel cell, causing an increase in internal resistance of the fuel cell.

Stainless steel, titanium alloys, aluminum alloys, nickel alloys, and the like have been proposed as candidate materials for the separator of the fuel cell. Among these materials, stainless steel has received attention for its lower price and good corrosion resistance, but further improvements in corrosion resistance and electrical conductivity are still needed.

DISCLOSURE

Technical Problem

The present invention is directed to providing a metal separator for fuel cells that has corrosion resistance and contact resistance satisfying the standards set by the Department of Energy (DOE) not only at an initial stage but also after being exposed to high temperature/high humidity conditions in the fuel cell for a long period of time, and a method for manufacturing the same.

The technical problems of the present invention are not limited to the foregoing problems, and other technical problems will be clearly understood by those skilled in the art from the following description.

Technical Solution

In accordance with an aspect of the present invention, a method for manufacturing a metal separator for fuel cells includes: preparing a stainless steel sheet as a matrix of the metal separator; forming a discontinuous coating film on the surface of the stainless steel sheet, the coating film being composed of at least one selected from gold (Au), platinum (Pt), ruthenium (Ru), iridium (Ir), ruthenium oxide ($RuO_2$), and iridium oxide ($IrO_2$); and heat treating the stainless steel sheet having the discontinuous coating film to form an oxide film on a portion of the stainless steel sheet on which the coating film is not formed.

The discontinuous coating film may have a coating density of 5 to 500 μg/cm², and the heat treatment may be performed at a temperature of 80 to 300° C. The discontinuous coating film may be composed of nanoparticles, and the stainless steel sheet may include 0.08 wt % or less of carbon (C), 16 to 28 wt % of chromium (Cr), 0.1 to 20 wt % of nickel (Ni), 0.1 to 6 wt % of molybdenum (Mo), 0.1 to 5 wt % of tungsten (W), 0.1 to 2 wt % of tin (Sn), 0.1 to 2 wt % of copper (Cu), and the balance of iron (Fe) and unavoidable impurities. Heat treatment may be performed for 10 minutes to 3 hours. Further, heat treatment may be performed under at least one of a vacuum, an atmosphere, and an oxygen atmosphere.

In accordance with another aspect of the present invention, a metal separator for fuel cells includes: a stainless steel sheet as a matrix of the metal separator; a discontinuous coating film formed on the surface of the stainless steel sheet, the coating film being composed of at least one selected from gold (Au), platinum (Pt), ruthenium (Ru), iridium (Ir), ruthenium oxide ($RuO_2$), and iridium oxide ($IrO_2$); and an oxide film formed on a portion of the stainless steel sheet on which the coating film is not formed.

The metal separator may have a corrosion current density of 1 μA/cm² or less and a contact resistance of 10 mΩ·cm² or less on both surfaces thereof.

Advantageous Effects

The metal separator for fuel cells according to embodiments of the invention has excellent corrosion resistance and electrical conductivity not only at an initial stage but also after long-term use in operational conditions of the fuel cell.

In addition, the method for manufacturing a metal separator for fuel cells according to embodiments of the invention allows surface modification to obtain excellent durability even with a general inexpensive stainless steel sheet, thereby lowering manufacturing costs of the metal separator.

The metal separator for fuel cells according to the embodiments of the invention has a corrosion current density of 1

μA/cm² or less and a contact resistance of 10 mΩ·cm² or less on both surfaces of the separator.

MODE FOR INVENTION

Exemplary embodiments of the present invention will now be described in detail with reference to the accompanying drawings.

It should be understood that the drawings are not to precise scale and may be exaggerated in thickness of lines or size of components for descriptive convenience and clarity only. Further, it should be understood that when a layer or film is referred to as being "on" another layer or film, it can be directly on the other layer or film, or intervening layers may also be present.

Figure 1:
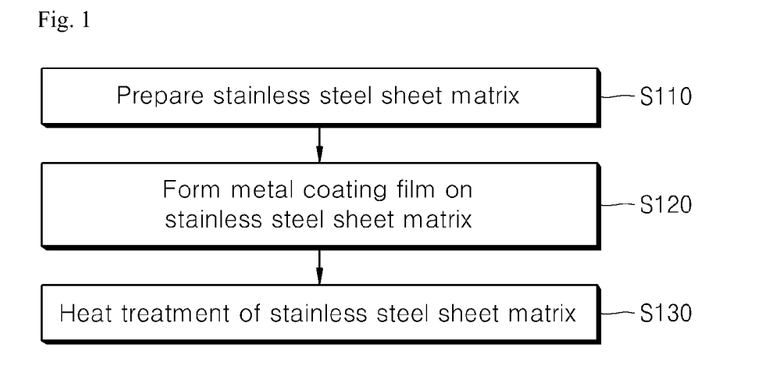
FIG. 1 is a flowchart illustrating a method for manufacturing a metal separator for fuel cells according to one exemplary embodiment of the present invention.

FIG. 1 is a flowchart illustrating a method for manufacturing a metal separator for fuel cells according to one exemplary embodiment of the invention.

Referring to FIG. 1, operation S110 of preparing a stainless steel sheet as a matrix for a metal separator and operation S120 of forming a discontinuous coating film on the surface of the stainless steel sheet are performed. In this embodiment, the discontinuous coating film is composed of nanoparticles and serves to enhance conductivity and corrosion resistance of the metal separator. However, such a discontinuous shape may expose a portion of the stainless steel sheet, thereby causing reduction of corrosion resistance. Thus, according to this embodiment, the method includes heat treating the stainless steel sheet in S130 to form an oxide film on a region of the stainless steel sheet on which the discontinuous coating film has not been formed, that is, a region between the discontinuous coating films.

Here, the nanoparticles refer to particles having a particle size of 10 nm to 1 μm. Since the nanoparticles are coated at a density of 5 to 500 μg/cm² in consideration of economic feasibility for improving electrical conductivity, the coating film inevitably has a discontinuous shape. In other words, the preparation of a coating film having a higher density on the surface of the stainless steel sheet causes an increase in preparation cost.

Thus, in order to reduce the preparation cost as much as possible, the coating film is discontinuously formed on the surface of the stainless steel sheet.

As a result, the surface of the stainless steel sheet is partially exposed to the outside.

Furthermore, the oxide film formed on a portion of the stainless steel sheet which is directly exposed to the outside is composed of at least one component selected from metal components contained in the stainless steel sheet.

Next, the method for manufacturing a metal separator according to the exemplary embodiment of the invention will be described in more detail.

Figure 2:
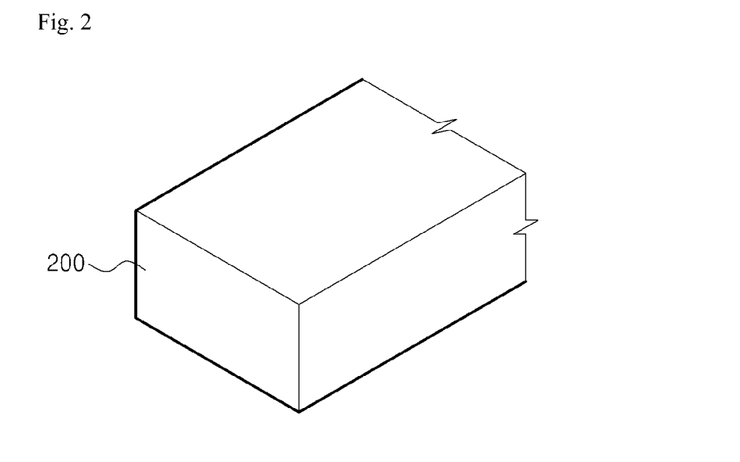
FIGS. 2 to 4 are perspective views of the metal separator in respective operations of the method of FIG. 1.
Figure 3:
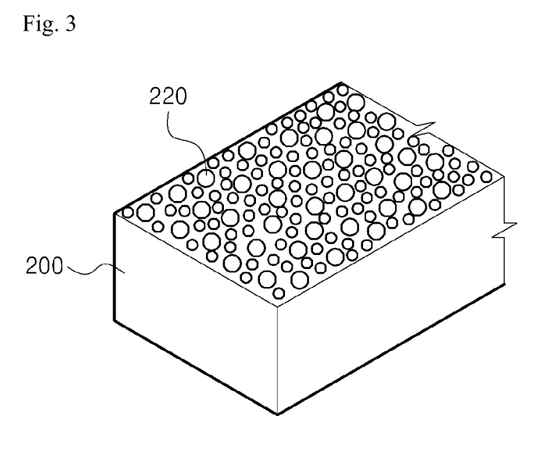
Figure 4:
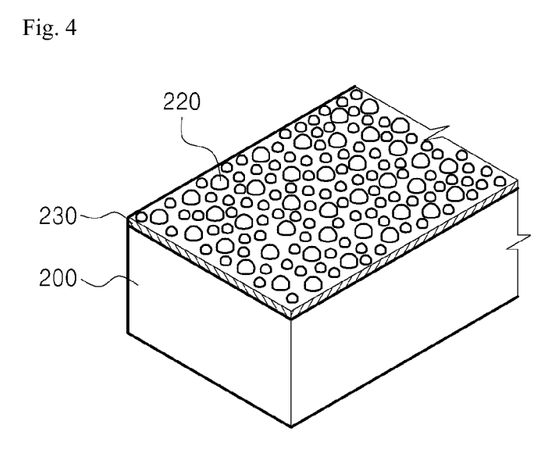
Figure 5:
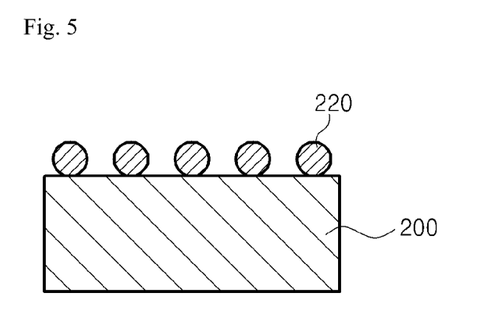
FIG. 5 is a sectional view of the separator of FIG. 3.
Figure 6:
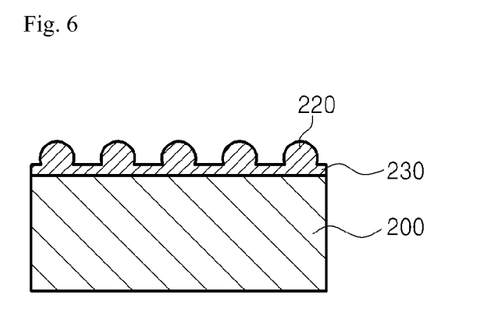
FIG. 6 is a sectional view of the separator of FIG. 4.

FIGS. 2 to 4 are perspective views of the metal separator in respective operations of the method of FIG. 1. In addition, FIG. 5 is a sectional view of the separator of FIG. 3 and FIG. 6 is a sectional view of the separator of FIG. 4.

Referring to FIG. 2, in order to fabricate a metal separator for fuel cells according to one exemplary embodiment, a stainless steel sheet matrix 200 is prepared.

In this embodiment, the stainless steel sheet matrix 200 may be a stainless steel sheet which contains 16 to 28 wt % of chromium. Specifically, the stainless steel sheet contains about 18 wt % of chromium.

More specifically, the stainless steel sheet matrix 200 includes 0.08 wt % or less of carbon (C), 16 to 28 wt % of chromium (Cr), 0.1 to 20 wt % of nickel (Ni), 0.1 to 6 wt % of molybdenum (Mo), 0.1 to 5 wt % of tungsten (W), 0.1 to 2 wt % of tin (Sn), 0.1 to 2 wt % of copper (Cu), and the balance of iron (Fe) and unavoidable impurities. In some embodiments, the stainless steel sheet may be an austenite stainless steel such as SUS 316L 0.2t.

Next, FIG. 3 shows an operation of forming a discontinuous coating film 220 on the surface of the stainless steel sheet matrix 200. In this embodiment, the discontinuous coating film 220 is formed for the following reasons.

When the surface of the stainless steel sheet matrix 200 is exposed for long durations to high temperature/high humidity operating conditions of a fuel cell, metal oxides are formed on the surface of the stainless steel sheet matrix 200. The metal oxides can maintain corrosion resistance but have a negative influence on electrical conductivity. Therefore, according to the present invention, the discontinuous coating film 220 is formed of a material exhibiting excellent corrosion resistance and electrical conductivity. As a result, the separator for the fuel cell according to exemplary embodiments of the invention may be prepared to have excellent corrosion resistance and electrical conductivity not only at an initial operating stage but also after long-term operation.

In some embodiments, the material exhibiting excellent corrosion resistance and electrical conductivity may include any one selected from gold (Au), platinum (Pt), ruthenium (Ru), iridium (Ir), ruthenium oxide ($RuO_2$), and iridium oxide ($IrO_2$).

In some embodiments, the discontinuous coating film 220 may be formed by any process selected from electrolyte plating, electroless plating and a PVD process. In some embodiments, the discontinuous coating film 220 may have a coating density of 5 to 500 μg/cm².

If the coating density is less than 5 μg/cm², it can be difficult to secure a desired degree of electrical conductivity. If the coating density exceeds 500 μg/cm², the effect of improving electrical conductivity is not obtained in proportion to the increase of the coating amount. Thus, in the present invention, the process of determining the coating density is an essential element and the coating density is measured as follows.

When the coating film is formed of gold (Au), a steel sheet matrix (metal separator) coated with gold nanoparticles is dissolved in 3 liters of aqua regia and the concentration of gold ions is measured using atomic absorption spectroscopy (AAS) to calculate the coating density of gold (Au) according to Equation 1:

Coating density of gold (Au) (ug/cm$^2$)={3*concentration of gold (Au) ions (ppM)}/total area of metal separator (cm$^2$)

As shown in FIGS. 3 and 5, the coating film 220 is discontinuously formed on the surface of the stainless steel sheet. Generally, it is possible to secure desired characteristics of the metal separator when the separator includes the coating film as shown therein. However, in order to ensure that the metal separator has a corrosion current density of 1 $\mu$A/cm$^2$ or less and a contact resistance of 10 m$\Omega$·cm$^2$ or less on both surfaces thereof, a process of forming an oxide film through heat treatment is performed.

FIG. 4 is a perspective view of a heat treatment process for forming an oxide film and FIG. 6 is a sectional view of the separator shown in FIG. 4.

Referring to FIGS. 4 and 6, an oxide film 230 is formed on a portion of the stainless steel sheet matrix 200, on which the discontinuous coating film 220 is not formed, through heat treatment.

As such, the metal separator for fuel cells according to this embodiment is completely shielded by the discontinuous coating film 220 and the oxide film 230, thereby ensuring excellent corrosion resistance.

In some embodiments, heat treatment may be performed at 80 to 300° C. for 10 minutes to 3 hours. Further, heat treatment may be performed under at least one of a vacuum, an atmosphere, and an oxygen atmosphere.

The method according to the embodiment of the invention may provide a metal separator for fuel cells which has superior corrosion resistance and electrical conductivity not only at an initial stage but also after long-term use in operational conditions of the fuel cell.

Consequently, the metal separator for fuel cells manufactured by the method according to the embodiment of the invention includes the stainless steel sheet matrix 200, the discontinuous coating film 220 formed on the surface of the stainless steel sheet matrix 200 and composed of at least one selected from gold (Au), platinum (Pt), ruthenium (Ru), iridium (Ir), ruthenium oxide (RuO$_2$), and iridium oxide (IrO$_2$), and the oxide film 230 formed on a portion of the stainless steel sheet matrix 200 on which the discontinuous coating film 220 is not formed.

Next, a description of the present invention will be given with reference to inventive examples and comparative examples. Further, measurement of corrosion resistance and electrical conductivity of the metal separator will be described with reference to a process of measuring corrosion current density and a process of measuring contact resistance.

316L stainless steel was used as a stainless steel sheet matrix. A discontinuous coating film was formed on the surface of the stainless steel sheet matrix to secure electrical conductivity and an oxide film was formed thereon through heat treatment to secure corrosion resistance. Here, the following experiment was performed to determine economically feasible and optimal conditions for forming a coating film and an oxide film.

1. Measurement of Contact Resistance

First, contact resistance was measured using a contact resistance tester to evaluate electrical conductivity.

Figure 7:
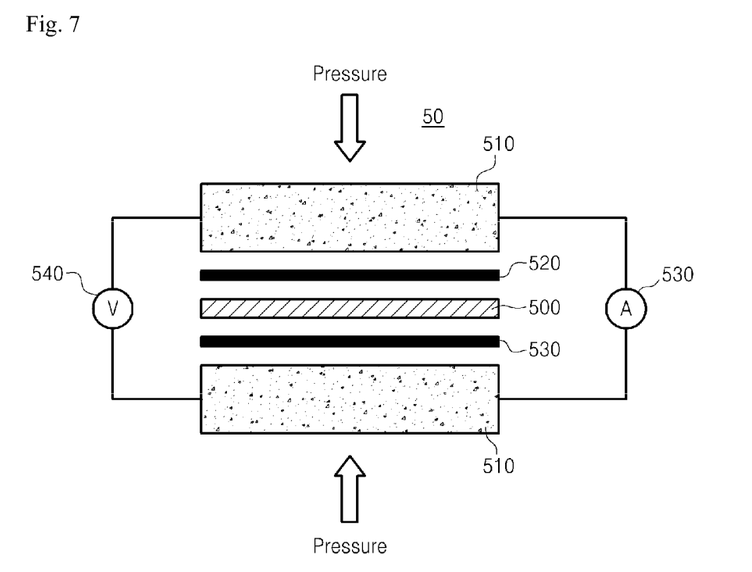
FIG. 7 is a schematic view of a contact resistance tester for measuring contact resistance of a stainless steel sheet according to the present invention.

FIG. 7 is a sectional view of a contact resistance tester for measuring contact resistance of a stainless steel separator according to one exemplary embodiment of the invention.

Referring to FIG. 7, in order to determine optimal parameters for cell assembly through measurement of contact resistance of a stainless steel sheet 500, a modified Davies method was used to measure contact resistance between stainless steel SS and two pieces of carbon paper.

The contact resistance was measured based on the principle of measuring four-wire current-voltage via a contact resistance tester available from Zahner Inc., Model IM6.

Measurement of contact resistance was performed by application of DC 5 A and AC 0.5 A to a measurement target through an electrode area of 25 cm$^2$ in a constant current mode at a frequency in the range of 10 kHz to 10 mHz. The carbon paper was 10 BB available from SGL Inc.

In the contact resistance tester 50, a sample 500 was disposed between two pieces of carbon paper 520 and gold coated copper plates 510 connected to both a current supplier 530 and a voltage tester 540.

Next, voltage was measured by applying DC 5 A/AC 0.5 A to the sample 500 through an electrode area of 25 cm$^2$ using a current supplier 530 (available from Zahner Inc., Model IM6).

Then, the sample 500, carbon paper 520, and copper plates 510 were compressed to form a stack structure from both copper plates 510 of the contact resistance tester 50 using a pressure regulator (Model No. 5566, available from Instron Inc., compression maintenance test). Using the pressure regulator, a pressure of 50~150 N/cm$^2$ was applied to the contact resistance tester 50.

Figure 8:
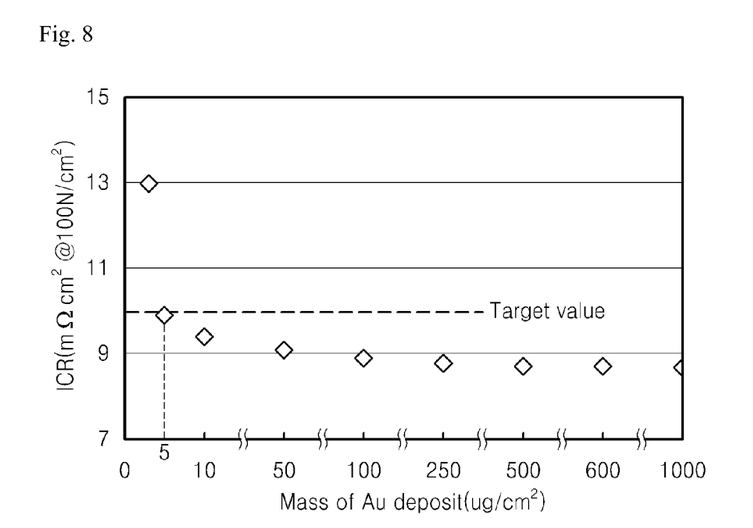
FIG. 8 is a graph depicting results of evaluating contact resistance of a metal separator for fuel cells according to the present invention.

The results of measurement using the contact resistance tester 50 are shown in FIG. 8.

FIG. 8 is a graph depicting results of evaluating contact resistance of a metal separator for fuel cells according to one exemplary embodiment of the invention.

In FIG. 8, the metal separator was not subjected to heat treatment in order to investigate conduction properties only through the coating film according to the present invention.

The coating film was formed of gold (Au) at a coating density (Mass of Au deposit($\mu$g/cm$^2$)) of 3~1000 $\mu$g/cm$^2$ and the target value of the contact resistance (IRC) was set to 10 m$\Omega$·cm$^2$ at both sides of the separator under a pressure of 100 N/cm$^2$.

Referring to FIG. 8, when the coating density of gold was in the range of 5~500 $\mu$g/cm$^2$, the metal separator exhibited desired contact resistance. Further, when comparing the contact resistance at a coating density of 500 $\mu$g/cm$^2$ with that at a coating density of 1000 $\mu$g/cm$^2$, it can be seen that reduction in resistance is very insignificant and a coating density exceeding 500 $\mu$g/cm$^2$ is thus inefficient in terms of coating cost for increasing coating amount.

Therefore, according to the present invention, the discontinuous coating film may have a coating density of 5 to 500 $\mu$g/cm$^2$.

Next, the corrosion current density was measured in order to evaluate influence of heat treatment on the metal separator for fuel cells according to the present invention.

2. Measurement of Corrosion Current Density

Corrosion current density (hereinafter, "corrosion density") of the metal separator according to the present invention was measured using a corrosion current tester EG&G Model No. 273A. Tests for corrosion durability were performed in a simulated environment of a polymer electrolyte fuel cell (PEFC).

After being etched at 80° C. with 0.1N $H_2SO_4$+2 ppm HF as an etching solution, the stainless steel sheet samples were subjected to $O_2$ bubbling for 1 hour, and the corrosion current density thereof was measured at an open circuit potential (OCP) of –0.25V~1V vs. SCE.

Further, other physical properties were measured at –0.24V vs. SCE (saturated calomel electrode) for a PEFC anode environment and at 0.6V vs. SCE for a PEFC cathode environment.

Here, the measured properties were evaluated based on data of corrosion current at 0.6V vs. SCE in a simulated cathode environment of a fuel cell.

The anode environment is an environment in which hydrogen is split into hydrogen ions and electrons while passing through a membrane electrode assembly (MEA), and the cathode environment is an environment in which oxygen combines with the hydrogen ions to produce water after passing through the MEA.

Since the cathode environment has a high potential and is a very corrosive environment, corrosion resistance is preferably tested in the cathode environment.

Further, it is desirable that the stainless steel sheet have a corrosion current density of 1 $\mu A/cm^2$ or less for application to the PEMFC.

Figure 9:
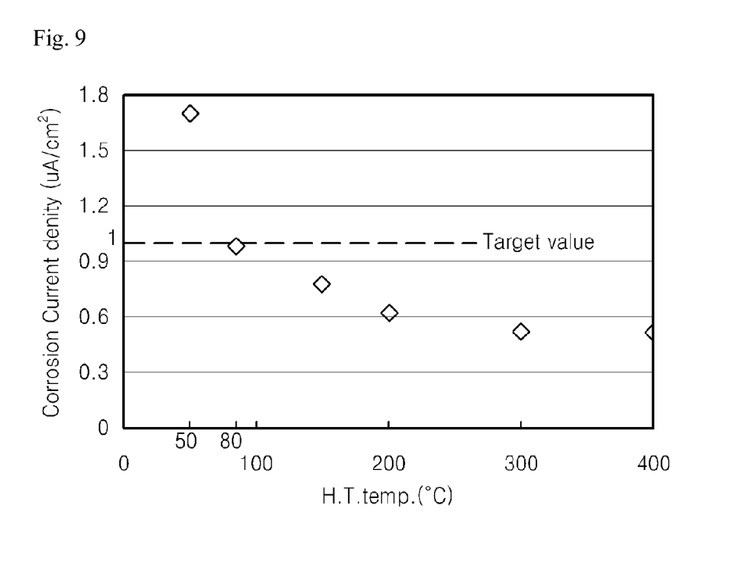
FIG. 9 is a graph depicting results of evaluating corrosion current density of a metal separator for fuel cells according to the present invention.

FIG. 9 is a graph depicting results of evaluating corrosion current density of the metal separator for fuel cells according to the present invention.

In FIG. 9, the metal separator was subjected to heat treatment at 50 to 400° C. for 30 minutes without forming the discontinuous coating film in order to evaluate pure corrosion resistance characteristics of the separator. Here, the target value of corrosion current density was set to 1 $\mu A/cm^2$ or less. As a result, upon heat treatment at 50° C., the corrosion current exceeded the reference value, and upon heat treatment at 80° C. or more, desired corrosion resistance could be obtained.

In addition, when comparing the corrosion density at 300° C. with the corrosion density at 400° C., reduction in corrosion current density was very insignificant. As the temperature for heat treatment increases, energy consumption for heating increases. Thus, it can be seen that since there is no significant variation in corrosion current density for heat treatment at a temperature exceeding 300° C., usability of heat treatment is lowered. Therefore, according to the present invention, heat treatment may be performed at a temperature in the range of 80 to 300° C.

In this invention, optimal conditions were determined through experimentation and suitability of these conditions was evaluated with reference to examples and comparative examples described below.

EXAMPLES AND COMPARATIVE EXAMPLES

Example 1

A discontinuous gold (Au) coating film was formed at a coating density of 5 $\mu g/cm^2$ on a metal separator formed of stainless steel (316L). Heat treatment was performed at 80° C., 150° C., 200° C., 300° C. and 400° C. in order to evaluate the coating density according to the temperature for heat treatment. Heat treatment was performed for 30 minutes in an oxygen atmosphere.

Example 2

The metal separator of Example 2 was obtained under the same conditions as Example 1 except that the gold (Au) coating film was formed at a coating density of 50 $\mu g/cm^2$.

Example 3

The metal separator of Example 3 was obtained under the same conditions as in Example 1 except that the gold (Au) coating film was formed at a coating density of 100 $\mu g/cm^2$.

Examples 4 to 6

Each of platinum (Pt) (Example 4), iridium (Ir) (Example 5), and ruthenium (Ru) (Example 6) coating films was formed at a coating density of 50 $\mu g/cm^2$ and heat treatment was performed at 80° C. for 10 minutes under vacuum.

Examples 7 and 8

Each of iridium oxide (Ir) (Example 7) and ruthenium oxide (Ru) (Example 8) coating films was formed at a coating density of 50 $\mu g/cm^2$ and heat treatment was performed at 100° C. for 3 hours in an oxygen atmosphere.

Comparative Example 1

The metal separator of Comparative Example 1 was obtained under the same conditions as in Example 1 except that the gold (Au) coating film was formed at a coating density of 1000 $\mu g/cm^2$.

Comparative Example 2

The metal separator of Comparative Example 2 was obtained under the same conditions as in Example 1 except that the gold coating film was formed at a coating density of 3 $\mu g/cm^2$.

Comparative Example 3

The gold coating film was discontinuously formed at a coating density of 50 $\mu g/cm^2$ and heat treatment was performed at 50° C. for 30 minutes in an atmosphere.

A. Evaluation of Corrosion Current Density and Contact Resistance in Simulated Fuel Cell Environment (A-1) Evaluation of Corrosion Current Density in Simulated Fuel Cell Environment For a simulated fuel cell environment to evaluate corrosion current density of each of the metal separators for fuel cells according to Examples 1, 2 and 3 and Comparative Examples 1 and 2, EG&G Model No. 273A was used. As illustrated in FIG. 9, heat treatment was performed at a temperature in the range of 80 to 400° C. After being immersed in 0.1N $H_2SO_4$+2 ppm HF at 80° C., stainless steel sheet samples were subjected to $O_2$ bubbling for 1 hour, followed by application of a constant voltage of 0.6 V vs. SCE thereto. After applying the constant voltage for a predetermined duration, the corrosion current density of each sample was measured.

Figure 10:
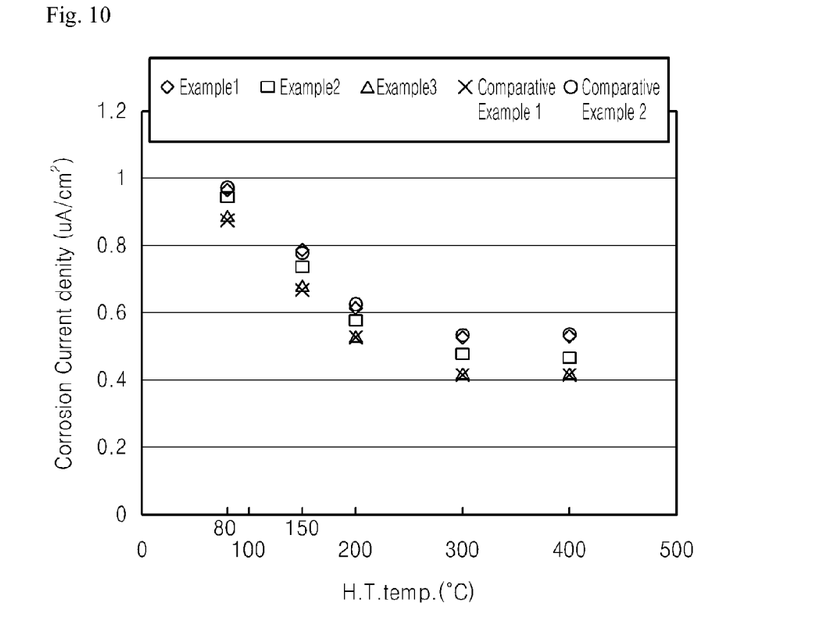
FIG. 10 is a graph depicting results of evaluating corrosion current density of each of metal separators for fuel cells according to examples and comparative examples in a simulated fuel cell environment.

FIG. 10 is a graph depicting results of evaluating corrosion current density of each of metal separators for fuel cells according to examples and comparative examples in a simulated fuel cell environment.

As can be seen from FIG. 10, all of the metal separators according to the examples exhibited relatively stable characteristics through heat treatment after forming the gold coating film.

Further, although not shown in the figure, the metal separator of Comparative Example 3 had a corrosion current density of 1.7 uA/cm², which was much higher than those of the examples. Thus, it can be seen that corrosion resistance was significantly deteriorated due to heat treatment at 50° C., which was lower that the temperature for heat treatment in the examples.

For Comparative Example 1 in which the gold coating film was thickly formed, the corrosion current density was substantially similar to that in Example 3. Thus, it can be seen that usability is low due to insignificant improvement in efficiency through cost increase.

(A-2) Evaluation of Contact Resistance in Simulated Fuel Cell Environment

Figure 11:
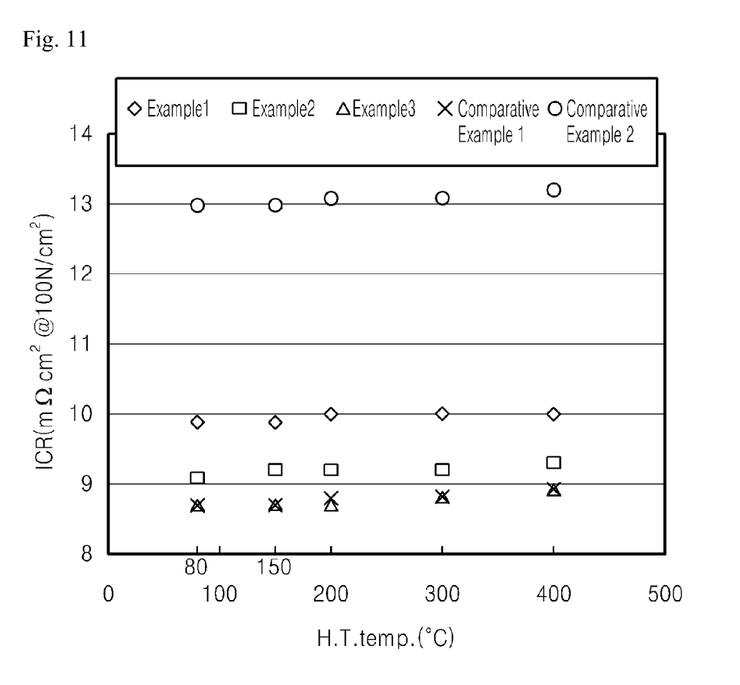
FIG. 11 is a graph depicting results of evaluating contact resistance of each of the metal separators for fuel cells according to the examples and the comparative examples in a simulated fuel cell environment.

A simulated fuel cell environment to evaluate contact resistance of each of the metal separators for fuel cells according to Examples 1, 2 and 3 and Comparative Examples 1 and 2 was the same as in FIG. 8, and results thereof are shown in FIG. 11.

FIG. 11 is a graph depicting results of evaluating contact resistance of each of the metal separators for fuel cells according to the examples and the comparative examples in a simulated fuel cell environment.

Referring to FIG. 11, when the discontinuous coating film according to the invention was formed, the separator according to Comparative Example 2 did not satisfy a reference coating density and exhibited very high contact resistance. Thus, it can be seen that the separator according to Comparative Example 2 has very low electrical conductivity.

Further, for Comparative Example 1 in which the coating density exceeded the reference value, the contact resistance was substantially the same as that in Example 3. Thus, it can be seen that usability is low due to insignificant improvement in efficiency through cost increase.

As such, the optimal conditions for manufacture of the metal separator for fuel cells were determined through combination of the aforementioned evaluation results, and long term durability of the metal separator for fuel cells fabricated by the method according to the present invention through application of the results was evaluated.

B. Evaluation and Results of Long-Term Durability of Fuel Cell (B-1) Evaluation Method of Long-Term Durability Separators each having a serpentine passage for supplying reaction gases were used. Each fuel cell was prepared by interposing a membrane electrode assembly (Model 5710 of Gore Fuel Cell Technologies) and a gas diffusion layer (Model 10BA of SGL Ltd.) between the separators and compressing the same at a predetermined pressure.

Performance of each of the fuel cells was evaluated using a unit cell. NSE Test Station 700W class was used as a fuel cell operator, and KIKUSUI E-Load was used as an electronic load for evaluating the performance of the fuel cell. A current cycle of 1 A/cm² current for 15 seconds was constantly applied for 2,000 hours.

As the reaction gases, hydrogen and air were supplied at a flux of maintaining a stoichiometric ratio of $H_2$ to air of 1.5:2.0 according to the electric current after being humidified to a relative humidity of 100%. The performance of the fuel cell was evaluated at atmospheric pressure while maintaining the temperature of a humidifier and the cell at 65° C. At this time, active area was 25 cm² and operating pressure was 1 atm.

(B-2) Evaluation Results of Long-Term Durability

Figure 12:
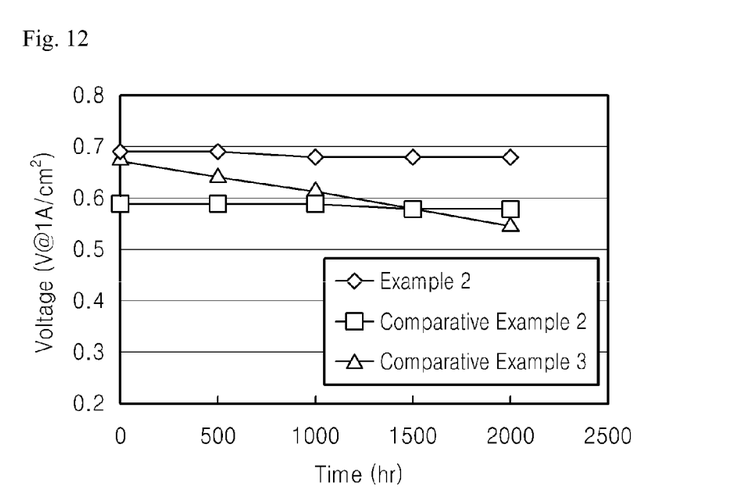
FIG. 12 is a graph depicting results of evaluating long-term durability of each of the metal separators for fuel cells according to the examples and the comparative examples in a simulated fuel cell environment.

FIG. 12 is a graph depicting results of evaluating long-term durability of each of the metal separators for fuel cells according to the examples and the comparative examples in a simulated fuel cell environment.

In this evaluation, the separator sample subjected to heat treatment at 150° C. for 30 minutes in an oxygen atmosphere was used among the separator samples of Example 2 (coating density of 50 μg/cm²), and the separator sample subjected to heat treatment at 150° C. for 30 minutes in an oxygen atmosphere was used among the separator samples of Comparative Example 2 (coating density of 3 μg/cm²). Further, the separator of Example 3 was subjected to evaluation of long-term durability of a fuel cell in a simulated fuel cell environment. Evaluation results are shown in FIG. 12.

In addition, the separators of Examples 4 to 8 were subjected to evaluation of long-term durability of a fuel cell and evaluation results are listed in Table 1.

TABLE 1

|  | Performance of fuel cell (V@1 A/cm²) | |
| --- | --- | --- |
|  | 0 hour | 2,000 hours |
| Example 4 | 0.68 | 0.67 |
| Example 5 | 0.68 | 0.67 |
| Example 6 | 0.69 | 0.68 |
| Example 7 | 0.68 | 0.67 |
| Example 8 | 0.69 | 0.67 |

First, referring to FIG. 12, the fuel cell of Comparative Example 2 generated a voltage of about 0.59V, which was much lower than the 0.69 V of Example 2, upon application of a current density of 1 A/cm², and both exhibited similar difference in voltage generation after 2,000 hours. This result was caused by lower electrical conductivity of Comparative Example 2 than that of Example 2. In other words, since the metal separator of Comparative Example 2 had a significantly higher contact resistance, the fuel cell of Comparative Example 2 exhibited significantly low performance even at an initial stage.

Further, the fuel cell of Comparative Example 3 generated a voltage similar to that of Example 2 at an initial operating stage but underwent significant reduction in generation of voltage over time. This result was caused by low corrosion resistance regardless of similar electrical conductivity.

Next, as can be seen from the results of Table 1, all of the fuel cells according to the examples exhibited similar durability. This result is also shown in FIG. 12, and it can be seen that the fuel cells according to the examples exhibit superior performance to those of the comparative examples.

Therefore, the method for manufacturing a metal separator for fuel cells according to the present invention enables surface modification to obtain excellent durability even with a general inexpensive stainless steel sheet, thereby lowering manufacturing costs of the metal separator while improving efficiency thereof.

The invention claimed is:

1. A method for manufacturing a metal separator for fuel cells, comprising:
preparing a stainless steel sheet as a matrix of the metal separator;
forming a discontinuous coating film on a surface of the stainless steel sheet, the discontinuous coating film being composed of at least one of the group consisting of gold (Au), platinum (Pt), ruthenium (Ru), iridium (Ir), ruthenium oxide (RuO2), and iridium oxide (IrO2), the discontinuous coating film consisting of nanoparticles having a particle size of 10 nm to 1000 nm; and heat treating the stainless steel sheet having the discontinuous coating film to form an oxide film on a portion of the stainless steel sheet on which the discontinuous coating film is not formed, wherein the discontinuous coating film has a coating density of 5 to 500 μg/cm$^2$.

2. The method of claim 1, wherein the heat treatment is performed at a temperature of 80 to 300° C.

3. The method of claim 1, wherein the stainless steel sheet comprises 0.08 wt % or less of carbon (C), 16 to 28 wt % of chromium (Cr), 0.1 to 20 wt % of nickel (Ni), 0.1 to 6 wt % of molybdenum (Mo), 0.1 to 5 wt % of tungsten (W), 0.1 to 2 wt % of tin (Sn), 0.1 to 2 wt % of copper (Cu), and the balance of iron (Fe) and unavoidable impurities.

4. The method of claim 1, wherein the heat treatment is performed for 10 minutes to 3 hours.

5. The method of claim 1, wherein the heat treatment is performed under at least one of a vacuum, an atmosphere, and an oxygen atmosphere.

6. A metal separator for fuel cells comprising:

a stainless steel sheet as a matrix of the metal separator;

a discontinuous coating film formed on a surface of the stainless steel sheet, the discontinuous coating film being composed of at least one of the group consisting of gold (Au), platinum (Pt), ruthenium (Ru), iridium (Ir), ruthenium oxide (RuO2), and iridium oxide (IrO2), the discontinuous coating film consisting of nanoparticles having a particle size of 10 nm to 1000 nm; and an oxide film formed on a portion of the stainless steel sheet on which the discontinuous coating film is not formed, wherein the discontinuous coating film has a coating density of 5 to 500 μg/cm$^2$.

7. The metal separator of claim 6, wherein the stainless steel sheet comprises 0.08 wt % or less of carbon (C), 16 to 28 wt % of chromium (Cr), 0.1 to 20 wt % of nickel (Ni), 0.1 to 6 wt % of molybdenum (Mo), 0.1 to 5 wt % of tungsten (W), 0.1 to 2 wt % of tin (Sn), 0.1 to 2 wt % of copper (Cu), and the balance of iron (Fe) and unavoidable impurities.

* * * * *